United States Patent [19]
Schmidt

[11] 3,941,603
[45] Mar. 2, 1976

[54] TIO$_2$ PIGMENT FOR INDUSTRIAL PAINTS BASED ON WATER REDUCIBLE SYSTEMS

[75] Inventor: Paul Gordon Schmidt, Wilmington, Del.

[73] Assignee: E. I. Du Pont de Nemours & Company, Wilmington, Del.

[22] Filed: Feb. 1, 1974

[21] Appl. No.: 438,942

[52] U.S. Cl. .............................. 106/300; 106/308 B
[51] Int. Cl.$^2$ ............................................ C09C 1/36
[58] Field of Search ........................ 106/300, 308 B

[56] References Cited
UNITED STATES PATENTS

| | | | |
|---|---|---|---|
| 3,146,119 | 8/1964 | Ritter | 106/300 |
| 3,510,333 | 5/1970 | Gonick et al. | 106/300 |
| 3,522,078 | 7/1970 | May et al. | 106/300 |
| 3,529,985 | 9/1970 | Jester et al. | 106/300 |

*Primary Examiner*—Patrick P. Garvin
*Assistant Examiner*—J. V. Howard

[57] ABSTRACT

Rutile TiO$_2$ is coated successively with precipitates of titania and alumina, the weight ratio of titania:alumina being about 0.5:1 to 1:1 and the total percentage of titania and alumina being about 7 to 8%, based on the weight of said rutile TiO$_2$. The pigment is especially suited for use in industrial paints, e.g., automotive and appliance coatings, which are based on water reducible systems.

3 Claims, No Drawings

3,941,603

TIO₂ PIGMENT FOR INDUSTRIAL PAINTS BASED ON WATER REDUCIBLE SYSTEMS

BACKGROUND OF THE INVENTION

Various techniques are known for the treatment of pigmentary titanium dioxide, $TiO_2$, in the rutile form with one or more hydrous oxides so as to achieve a high level of hiding power, gloss and dispersibility when the $TiO_2$ is used in the formulation of industrial paints, i.e., of the type employed for automotive and appliance finishing as well as for coil coatings—all of which need a hard durable surface. Seidel U.S. Pat. No. 2,387,534, for example, illustrates the production of numerous hydrous oxide-treated $TiO_2$ pigments. In the past the industrial paints have nearly all been based upon organic solvent systems. More recently, the waste disposal problems associated with such organic solvents have caused particular attention to be given to the development of aqueous-based or so-called "water reducible" industrial paint systems. A major difficulty of the latter systems has resided in the $TiO_2$ component since most pigments which give a satisfactory combination of hiding power, gloss and dispersibility in an organic solvent-based paint system would give inferior results in most water reducible systems.

SUMMARY OF THE INVENTION

The present invention is directed to the production of new pigment compositions exhibiting a high level of hiding power, gloss and dispersibility, especially when employed in industrial paints based upon water reducible systems. The pigment composition is composed of rutile $TiO_2$ coated successively with precipitates of titania and alumina, the weight ratio of titania:alumina being about 0.5:1 to 1:1 and the total percentage of titania and alumina being about 7 to 8%, based on the weight of the rutile $TiO_2$. The method for producing the new pigment composition comprises the following steps:

a. forming an aqueous slurry of rutile $TiO_2$ having a pH below about 4, b. adding to the slurry a quantity of $TiCl_4$ in a predetermined amount, c. adjusting the pH of the slurry to within a value of about 6–9, d. adding to the slurry a quantity of an aqueous alkali metal aluminate solution in a predetermined amount, while raising the pH to at least about 10, e. adjusting the pH of the slurry to within a value of about 6–9, and f. recovering and washing the resultant pigment; the predetermined amounts of $TiCl_4$ and alkali metal aluminate solution in steps (b) and (d) being such as to provide a weight ratio of titania:alumina of about 0.5:1 to 1:1 and a total percentage of titania and alumina of about 7 to 8%.

The use of a succession of titania and alumina treatments in accordance with the foregoing is found to result in a $TiO_2$ pigment exhibiting an outstanding combination of hiding power, gloss and dispersibility properties when used in water reducible systems for industrial paints. This is even evident when a comparison is made versus $TiO_2$ pigments also prepared using titania and alumina but in amounts outside the weight percentages and ratios indicated above.

DETAILS OF THE INVENTION

The base rutile titanium dioxide pigment may be prepared by the high temperature vapor phase oxidation of $TiCl_4$, the vapor phase hydrolysis of $TiCl_4$, or the hydrolysis of colloidally seeded sulfuric acid solutions of titaniferous raw materials such as ilmenite. The hydrolysate of the sulfuric acid process must be washed and calcined to develop the crystalline characteristic and particle size needed for the good light scattering characteristics of pigments.

In producing the pigment of the invention the rutile $TiO_2$ base is first formed into a slurry for successive treatment to deposit titania and alumina. The temperature of the slurry may vary from 20° to 90°C. during the treatment, but it is preferred that the temperature be from 50° to 70°C. The slurry should be agitated throughout the precipitation of both the titania and the alumina to insure general uniformity of the pH conditions within the specified ranges. In general the initial slurry should be prepared to have a solids content of about 100 to 900 g/l.

The treatments of the base $TiO_2$ pigment with a $TiCl_4$ solution to precipitate titania in accordance with the invention should take place under acid conditions, i.e., pH below about 4, and be followed by addition of alkali, such as NaOH or KOH solution, to raise the pH to about 6 to 9. Thereafter an aqueous solution of an alkali metal aluminate is added to the slurry and the pH is allowed to rise to a value of at least 10 thereby to precipitate the alumina. Subsequently the pH is lowered to between about 6 to 9. Any acid may be used for this purpose, but mineral acids such as HCl, $H_2SO_4$, $HNO_3$ and $H_3PO_4$ are preferred. A brief curing period may be provided between the successive titania and alumina treatments or after the final alumina treatment but this is not essential.

The $TiCl_4$ may be added directly to the slurry in liquid or gaseous form. As is often more convenient, however, it also may be added in the form of a solution obtained by mixing liquid $TiCl_4$ and ice cold HCl.

Any soluble aluminum salt which is alkaline in aqueous medium may be used in the process including sodium or potassium aluminate. Such aluminate solutions are conventionally prepared to contain excess caustic to facilitate solubility.

The titania and alumina treatments are carried out to precipitate a total of about 7 to 8% and a ratio of titania:alumina in the range of about 0.5:1 to 1:1, the percentages and ratios being on a weight basis relative to the $TiO_2$ base. A preferred pigment contains 3% titania and 4% alumina, based on the weight of the $TiO_2$. After treatment according to the process of the invention, the pigment is recovered by known procedures including neutralization of the slurry if necessary, filtration, washing, drying and frequently a dry grinding step such as micronizing. Drying is not necessary, however, as a thick slurry of the product can be used directly in preparing emulsion paints where water is the liquid phase.

The following examples will further illustrate the practice of the invention. Parts and percentages are by weight unless otherwise indicated. Therein and elsewhere in this specification percentages of titania and alumina are expressed as weight percentages calculated as $TiO_2$ and $Al_2O_3$, respectively, and based on the weight of the base or uncoated pigmentary $TiO_2$. The precipitated titania and alumina are, of course, in the form of hydrous oxides.

The test procedure for hiding power (H.P.) employed herein is as follows: A film of prepared polyester emulsion paint is drawn on a Morest Chart Form 09, a glossy paper chart having black and white areas, using a draw-down blade with an 0.0025 inch clearance. When the film is dried, the reflectances over the white and black backgrounds are measured using a Gardner Automatic Multipurpose Reflectometer. From these readings the contrast ratio is determined:

$$\text{Contrast ratio} = \frac{\text{reflectance over black}}{\text{reflectance over white}}$$

similarly, the contrast ratio is determined on a standard pigment. The relative hiding power of the samples is calculated as:

$$\text{H.P.} = \frac{\text{contrast ratio of sample}}{\text{contrast ratio of standard}} \times 100$$

The test procedure for 60°C. Gloss is determined according to ASTM D-523, Section 21.

The test procedure for Dispersion is an indication of the movement of wetted particles into the body of the liquid vehicle to effect a permanent particle separation (Paint Flow and Pigment Dispersion by T. C. Patton, p. 217). The dispersion test used to grade samples of the invention is the Hegman dispersion determined in accordance with ASTM D-1210, "Fineness of Grind".

EXAMPLES

Example I

This example illustrates a surface treatment whereby there is applied 3% titania and 4% alumina.

$TiCl_4$ containing about 1% $AlCl_3$ is oxidized with oxygen in the vapor phase using a tubular foraminous wall reactor as disclosed in Kruse U.S. pat. No. 3,203,763 to produce a rutile product. The $TiO_2$ product stream leaving the reactor is quenched with chlorine, cooled in watercooled flues and collected.

Five thousand grams of the base $TiO_2$ pigment are mixed with water at 60°C. to form a slurry having a solids content of 400 g $TiO_2/l$. Sulfuric acid (50%) is added to reduce the slurry pH to approximately 1.5. Seven hundred milliliters of a $TiCl_4$ solution (equivalent to 215 g $TiO_2/l$) are added. The latter solution is prepared by addition of liquid $TiCl_4$ to ice cold 50% HCl solution. Aqueous sodium hydroxide solution (50%) is added to precipitate the titania while bringing the slurry pH to 6.7. Five-hundred-sixty-five milliliters of an aqueous sodium aluminate solution (equivalent to 355 g $Al_2O_3/l$) are then added. The pH is approximately 11.35. Sulfuric acid (50%) is thereafter added to reduce the slurry pH to 8.3 ± 0.2. The sample is then allowed to stand for about 30 minutes, filtered, washed until free of residual ions to a resistance of 12,000 ohm-cm. dried and micronized. The results are compared versus a commercial pigment standard in which the same $TiO_2$ base is treated with only 1% titania and only 2% alumina. The pigment standard is one which is judged to be good in its combination of hiding power, gloss and dispersibility.

| Pigment | Hiding Power Tinting Strength | 60° Gloss | Hegman Dispersion |
|---|---|---|---|
| Example I | 113* | 92 | 7½ |
| Standard | 100 | 88 | 6½ |

*Value is relative to the Standard, which is given an arbitrary rating of 100.

As is clearly evident, the pigment of Example I excels in all respects.

Example II

The procedure of Example I is followed but with small changes in proportions to yield a product containing 4% titania and 4% alumina. Thus in this case the amount of base $TiO_2$ pigment is 2500 g, the amount of $TiCl_4$ solution is 463 ml (216 g $TiO_2/l$) and the amount of sodium aluminate solution is 286 ml (350 g $Al_2O_3/l$).

Again there is obtained a pigment rated excellent in terms of its combination of hiding power, gloss and dispersibility.

Example III

The procedure of Example I is followed but with small changes in proportions to yield a product containing 2½% titania and 5% alumina. Thus in this case the amount of base $TiO_2$ pigment is 2500 g, the amount of $TiCl_4$ solution is 283 ml (221 g $TiO_2/l$) and the amount of sodium aluminate solution is 358 ml (350 g $Al_2O_3/l$).

Again there is obtained a pigment rated excellent in terms of its combination of hiding power, gloss and dispersibility.

What is claimed is:

1. A new pigment composition exhibiting a high level of hiding power, gloss and dispersibility comprising: rutile $TiO_2$ coated successively and separately with a precipitate of titania and a precipitate of alumina, the weight ratio of titania:alumina being about 0.5:1 to 1:1 and the total percentage of titania and alumina being about 7 to 8%, based on the weight of said rutile $TiO_2$.

2. Pigment according to claim 1 wherein the weight percentage of titania is 3% and the weight percentage of alumina is 4%.

3. Method for producing a new pigment composition exhibiting a high level of hiding power, gloss and dispersibility which comprises the following steps:
   a. forming an aqueous slurry of rutile $TiO_2$ having a pH below about 4,
   b. adding to the slurry a quantity of $TiCl_4$ in a predetermined amount,
   c. adjusting the pH of the slurry to within a value of about 6–9,
   d. adding to the slurry a quantity of an aqueous alkali metal aluminate solution in a predetermined amount, while raising the pH to at least about 10,
   e. adjusting the pH of the slurry to within a value of about 6–9, and
   f. recovering and washing the resultant pigment; the said predetermined amounts of $TiCl_4$ and alkali metal aluminate solution being such as to provide a weight ratio of titania:alumina of about 0.5:1 to 1:1 and the total percentage of titania and alumina being about 7 to 8%.

* * * * *